(12) United States Patent
Anand et al.

(10) Patent No.: US 8,209,285 B2
(45) Date of Patent: Jun. 26, 2012

(54) METHOD AND A SYSTEM FOR PUBLISHING DATA

(75) Inventors: Pankaj Anand, Haryana (IN); Nitin Arora, Haryana (IN); Puneet Trehan, Haryana (IN); Rakesh Sharrma, Haryana (IN); Aniruddha Chaudhuri, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 496 days.

(21) Appl. No.: 12/090,658

(22) PCT Filed: Nov. 15, 2006

(86) PCT No.: PCT/IB2006/003216
§ 371 (c)(1),
(2), (4) Date: Apr. 18, 2008

(87) PCT Pub. No.: WO2007/057747
PCT Pub. Date: May 24, 2007

(65) Prior Publication Data
US 2008/0243871 A1    Oct. 2, 2008

(30) Foreign Application Priority Data
Nov. 15, 2005  (IN) .................................. 3049/2005

(51) Int. Cl.
*G06F 17/30* (2006.01)
(52) U.S. Cl. .................... 707/620; 707/610; 707/627
(58) Field of Classification Search .................. None
See application file for complete search history.

(56) References Cited

U.S. PATENT DOCUMENTS

| | | | | |
|---|---|---|---|---|
| 6,374,260 | B1 * | 4/2002 | Hoffert et al. | 1/1 |
| 6,944,651 | B2 * | 9/2005 | Onyon et al. | 709/217 |
| 7,257,767 | B1 * | 8/2007 | Carden, Jr. | 715/234 |
| 7,263,655 | B1 * | 8/2007 | Carden, Jr. | 715/234 |
| 7,296,025 | B2 * | 11/2007 | Kung et al. | 707/608 |
| 7,472,175 | B2 * | 12/2008 | Bartholomew | 709/219 |
| 7,478,194 | B2 * | 1/2009 | Desai | 711/111 |
| 7,685,282 | B2 * | 3/2010 | Okamura | 709/226 |
| 7,765,308 | B2 * | 7/2010 | Katz et al. | 709/229 |
| 2003/0046703 | A1 | 3/2003 | Knowles et al. | |
| 2005/0022132 | A1 * | 1/2005 | Herzberg et al. | 715/759 |
| 2006/0010251 | A1 * | 1/2006 | Mrsic-Flogel et al. | 709/245 |

FOREIGN PATENT DOCUMENTS

| | | |
|---|---|---|
| EP | 1338987 A1 | 8/2003 |
| WO | 01/28249 A1 | 4/2001 |
| WO | 01/80101 A1 | 10/2001 |
| WO | 02/088909 A2 | 11/2002 |

OTHER PUBLICATIONS

Nottigham M et al: "The Atom Syndication Format", IETF Standard-Working-Draft, Internet Engineering Task Force, IEFT, CH, vol. atompub, No. 6, Mar. 12, 2005, XP015038030, ISSN: 0000-0004 the whole document.

* cited by examiner

*Primary Examiner* — Debbie Le

(57) ABSTRACT

The present invention relates to a system and a method for single click publication of personal contents of user with the user's consent and sharing it with the rest of the world via internet. The published content can be accessed by other internet users at their desktop, viewed or shared or saved for later use. The complete process of publishing personal content on the internet is done on a single click and all others users receive notifications about new or changed content automatically on their desktop thereby enabling them to access the content.

26 Claims, 2 Drawing Sheets

METHOD AND A SYSTEM FOR PUBLISHING DATA

FIELD OF THE INVENTION

The present invention relates to a system and a method for publishing data on internet. More particularly, the present invention relates to a system and a method for making available personal content's of a user available to the public with the user's consent.

GLOSSARY OF TERMS

The following terms are used to explain the present invention. Unless specified to the contrary, the following terms are intended mean as described here below:

Publication: The process of making personal content's of a user available to the public with the user's consent. The content is made searchable by internet search engines and can be searched using relevant keywords by any user on the internet.

RSS: RSS is a simple XML-based system that allows users to subscribe to their favorite websites.

Atom: A file format.

BACKGROUND OF THE INVENTION

In today's world, information is growing at an enormous rate. It is believed that there still exist a large number of users who want to share and publish their documents, creations; pictures which are currently lying only on their desktop/laptop/personal digital assistor (PDA)/mobile phone, with the rest of the world.

Thus, huge amount of data from the users who wish to share the same, is still waiting to be organized, searched and shared with various internet users, communities and forums. The information from such various devices can make the internet content far more vast and enriched by adding millions of such user contents which are currently lying created but are inaccessible.

As it is commonly known, search engines are organizing the information available on the internet and making it universally accessible and useable. However, one of the restrictions of the search engines is that it can search only the content that has been published by web site owners/publishers.

Thus, there exists a need for providing improved system and method for making the personal content publicly available with the user's consent. The published content can then be received by other internet users at their desktop which can be viewed or shared or saved for later use. There is also a need to provide the complete process of publishing personal content on the internet on a single click thereby enabling all others users to receive notifications about new or changed content automatically on their desktop for accessing the same. Publishing will make the content searchable by the internet based search engine where internet users can search using keywords.

OBJECTS OF THE INVENTION

The main object of the present invention is to provide a method and a system for publishing data on internet that overcomes at least one of the drawbacks mentioned above or provides additional benefits.

BRIEF DESCRIPTION OF THE ACCOMPANYING DRAWING

In the drawings accompanying the specifications,

SUMMARY OF THE INVENTION

Figure 1:
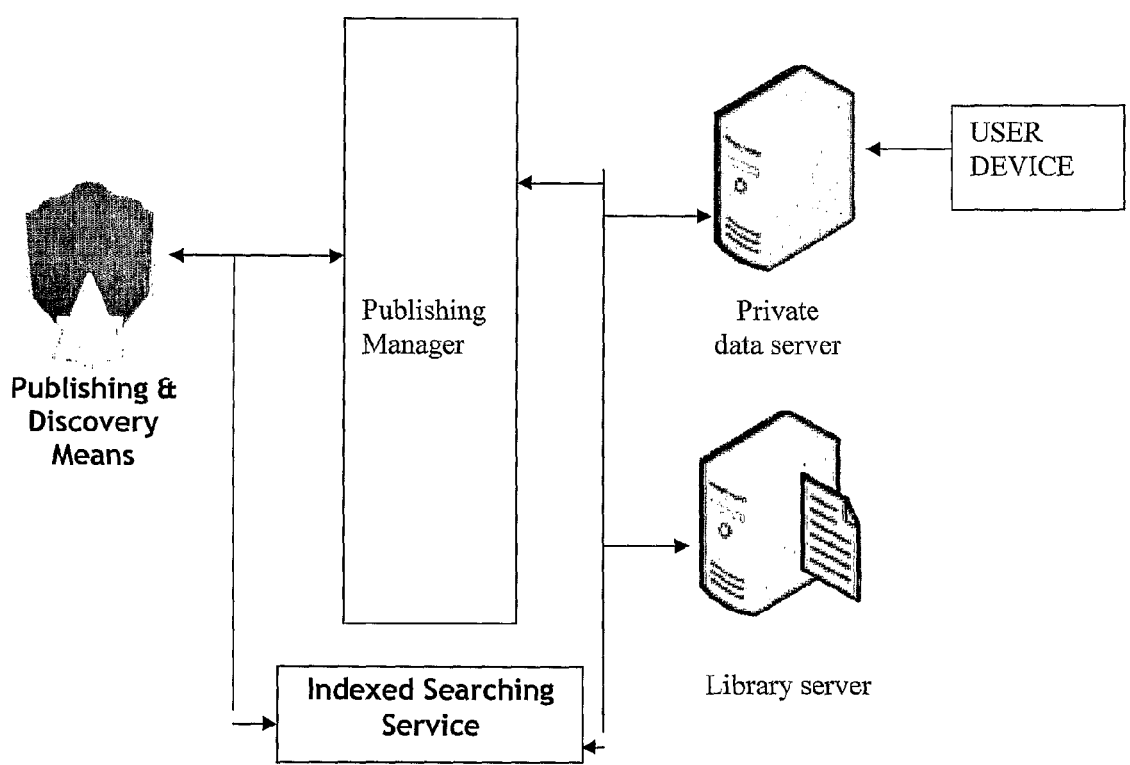
FIG. 1 illustrates the block diagram of the system for implementing the single click publishing process.

The present invention relates to a system and a method for single click publication of personal contents of user with the user's consent and sharing it with the rest of the world via internet. The published content can be accessed by other internet users at their desktop, viewed or shared or saved for later use. The complete process of publishing personal content on the internet is done on a single click and all others users receive notifications about new or changed content automatically on their desktop thereby enabling them to access the content.

DETAILED DESCRIPTION OF THE INVENTION

Accordingly, the present invention provides a system for publishing data with the user's consent and sharing the rest of the world via internet, said system comprising:
  a user device providing data for publication on the internet;
  an private data server configured to receive the data for publication from the user device and storing the same;
  a publication manager having a list of publication groups being in communication with the user device and being configured to receive from the user device at least one publication group selection and in response, copying the data from the private data server to a library server;
  a library server being in communication with the private data server and the publication manager for storing the data for publication in the publication group selected and further storing index of all the published files; and
  a publication and discovery means for publishing the data thus stored in the library server on the internet, thereby enabling sharing of the data by internet users.

In an embodiment of the present invention, the data is in the form of a file or a directory.

In another embodiment of the present invention, the private data server is configured to store the data online.

In yet another embodiment of the present invention, the publication manager is configured to generate RSS format file and/or Atom format file for the data thus copied on to the library server.

In still another embodiment of the present invention, the library server is categorized into various publication groups and the publication manager is configured to copy the data from the private data server to the selected publication group.

In a further embodiment of the present invention, the system further comprises an indexed searching means for indexing the data stored in the library server according to their groups they are stored in, their type, their size and various other data attributes.

In a further more embodiment of the present invention, the publication and discovery means optimizes the data for accessing by various search engines using search engine optimization (SEO) methods and publishes the data on the internet.

In one more embodiment of the present invention, name and various other keywords can be provided by the user device at the time of publishing the data on the internet or at any time subsequent thereafter.

In one another embodiment of the present invention, the library server is further configured to store an index of subscribers of data in respect of at least one of the publication groups.

In an embodiment of the present invention, the RSS format file and/or Atom format file thus generated is transmitted to the subscribers of the publication group, if they have opted to receive the same and optionally transmit the published data to the subscriber.

In another embodiment of the present invention, the system further comprises a synchronizer for identifying existence of updated data on the user device, which may be in the form of a changed or overwritten file or directory, and if desired by the user device, copying the updated data on to the library server.

In yet another embodiment of the present invention, if updated data is copied on to the library server, the system is configured to reflect the updated data as the published data.

In still another embodiment of the present invention, if updated data is copied on to the library server, the system is further configured to intimate the same to the subscribers of the publication group, if they have opted to receive the same and optionally transmit a copy of the updated data to the subscriber.

In a further embodiment of the present invention, the system is configured to allow the user device to withdraw of published data from the internet.

The present invention also provides a method for publishing data with the user's consent and sharing the rest of the world via internet, said method comprising the steps of:
(a) providing data for publication on the internet;
(b) receiving and storing the data for publication in an private data server;
(c) displaying a list of publication groups and receiving at least one publication group selection;
(d) in response to the selection, copying the data from the private data server to a library server and storing the same for publication in the publication group selected and further storing index of all the published files; and
(e) publishing the data thus stored in step (d) on the internet, thereby enabling sharing of the data by internet users.

In an embodiment of the present invention, the data is in the form of a file or a directory.

In another embodiment of the present invention, the data is stored online by the private data server.

In yet another embodiment of the present invention, a RSS format file and/or Atom format file is generated for the data thus copied on to the library server.

In still another embodiment of the present invention, the library server is categorized into various publication groups.

In a further embodiment of the present invention, the data from the private data server is copied to the selected publication group.

In a further more embodiment of the present invention, the method further comprises the step of indexing the data stored in the library server according to their groups they are stored in, their type, their size and various other data attributes.

In one more embodiment of the present invention, the data for accessing by various search engines is optimized using search engine optimization (SEO) methods and the data is published on the internet.

In one another embodiment of the present invention, the method further comprises the step of providing name and various other keywords at the time of publishing the data on the internet or at any time subsequent thereafter.

In an embodiment of the present invention, the method further comprises the step of storing an index of subscribers of the data in respect of at least one of the publication group.

In another embodiment of the present invention, the method further comprises the step of transmitting the RSS format file and/or Atom format file to the subscriber of the publication group, if they have opted to receive the same and optionally transmitting the published data to the subscribers.

In yet embodiment of the present invention, the method further comprises the step of identifying existence of updated data on the user device, which may be in the form of a changed or overwritten file or directory, and if desired by the user device, copying the updated data on to the library server.

In still another embodiment of the present invention, the method further comprises the step of reflecting the updated data as the published data, if updated data is copied on to the library server.

In a further another embodiment of the present invention, the method further comprises the step of intimating presence of updated data to the subscribers of the publication group, if they have opted to receive the same and optionally transmit a copy of the updated data to the subscriber.

In a further embodiment of the present invention, the method further comprises the step of allowing withdrawal of published data from the internet.

The invention is described in the following paragraphs with reference to specific embodiments, which is provided by way of exemplification. Nothing contained in this section is intended to limit the scope of the invention. The scope of the invention is to be limited purely by the claims and its equivalents.

Single-Click Publish—Overview

The user who has uploaded all the documents to the private data server, can choose to publish it to the internet using the method of the present invention. The complete process is explained below.

Step 1: Storing the document or files on the private data server (Online repository of user's data)—A Client Application (which resides on the user's machine) or a Web Client Application (a Browser based Client Application) can be used for storing or uploading the data to the private data server.

Step 2: Single-Click Publish—User selects any file which has been stored or uploaded on to the private data server and chooses a publication group from a predefined list of publication groups. The publication groups are categories created in the library server which can be subscribed by the internet users. There are pre-defined default publication groups in the library server which can select by any user. However, the user can also create new publication groups in the library. These publication groups help the users to easily manage, search and sort relevant information in the library server e.g. information technology can be a publication group containing sub-groups like software, hardware etc. Also if the user has not specified the publication group then the Publishing manager will automatically publish the content in the relevant group.

Step 3: Publication on Internet—The Content is published on the internet and is optimized for the various search engine using search engine optimization (SEO) methods so that users can search these files from the search engines on the internet. Various search engine optimization (SEO) methods are:

Make the title of published content: Make out top target keywords from published content & make the title of published page from that keyword.

Give relevant hints to user for keywords: Give hints to user while publishing the data about giving the keywords & description. Relevant keywords & description helps crawler to rank the page higher.

Submit the dense text page to search engine: Use a text browser such as Lynx to examine published content, because most search engine spiders see site much as Lynx would. So the densest textual pages are submitted to search engines for reference. Also the pages are prioritized according if the page has more keywords that are relevant to published data.

Create site map for published data: Site map helps the crawler to search the site structure easily. Also the movement the published content is updated the site map is also updated accordingly.

Allow search bots: Allow search bots to crawl without session IDs or arguments that track their path through the site. Using these techniques may result in incomplete indexing of your site, as bots may not be able to eliminate URLs that look different but actually point to the same page.

Server Settings: Publishing server supports the If-Modified-Since HTTP header. This feature allows web server to tell search engine whether your content has changed since we last crawled your site. Supporting this feature saves bandwidth and overhead.

Updated information for crawler: The robot.txt files at any time in the published web content directory is updated. When the published content is republished with changes then the robot.txt is also updated to help the crawler.

Most relevant keywords: Keywords are picked from the information rich published data. If published document have multiple pages then most relevant information is picked & added in the page title & head tag.

HTML tags: Make sure that your TITLE and ALT tags are descriptive and accurate by using the keywords & description fields of published contents.

Figure 2:
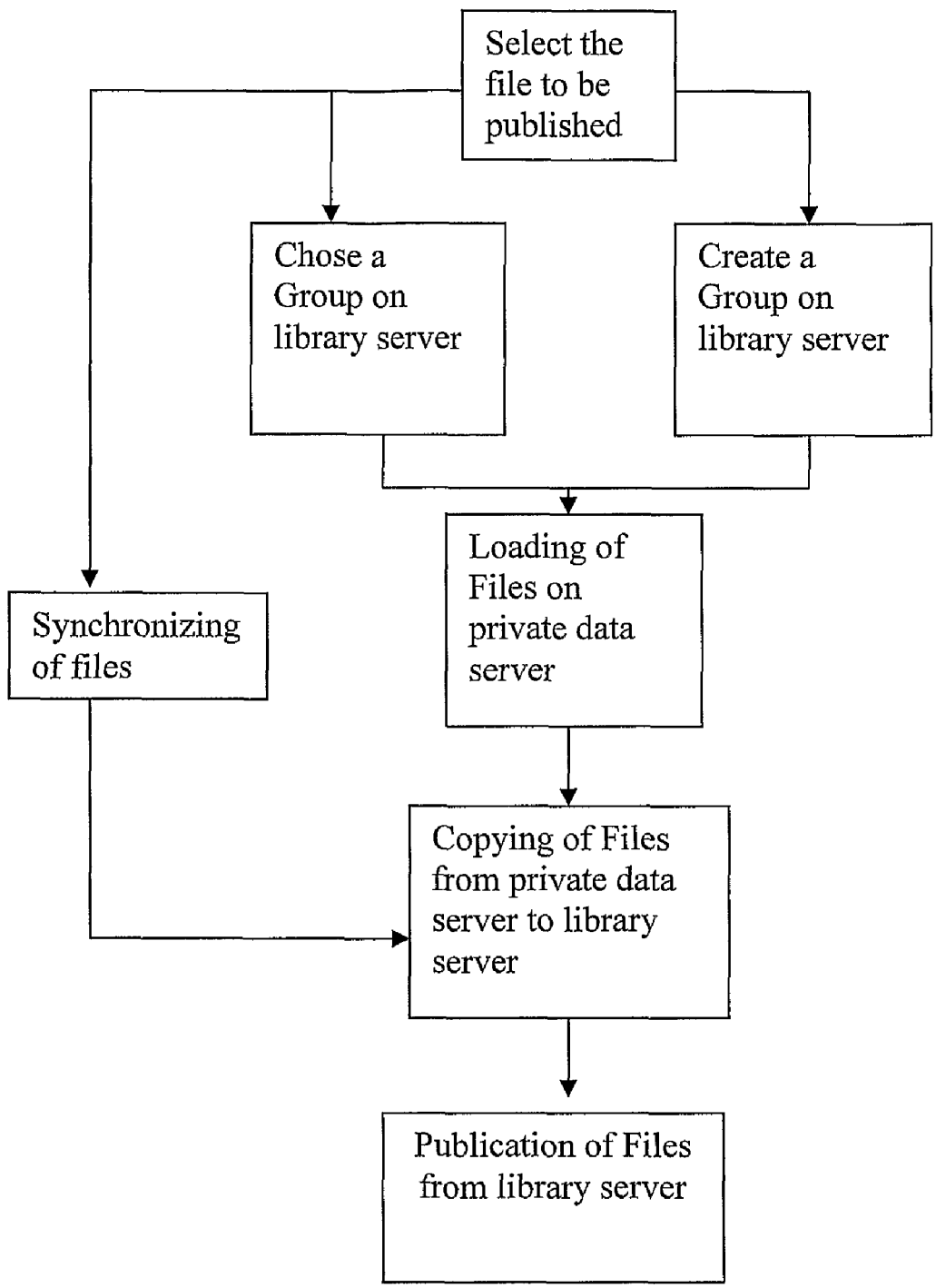
FIG. 2 illustrates the data flow diagram of the single click publishing process.

In the following paragraphs some of the preferred embodiments of the method are described. It should be understood that the preferred embodiments are only optional in nature and the invention can be worked without implementing the preferred embodiments. The following is described in the context of FIGS. 1 and 2.

Step 1 and 2: Publication of the data on the Internet: The data is published on the internet adopting the below described process:

a. The user uploads the data to be published on to the private data server. The data is uploaded either in the form of a file or a directory. However, it should be understood, that other forms of uploading the data can also be adopted. The user can upload more than one file or directory at the same time to the private data server. Subsequently, the user selects the from the data uploaded at least one data which is to be published (if there are multiple files uploaded by the user) and selects a publication group and chooses the option to "Publish" the data.

b. The Publishing Manager (a sub-component managing publishing process) copies the file from the private data server to the publication group in the library server (the Online, searchable global catalog of files) as specified by the user. Since, the library server is exposed to every internet user, it is kept separate in order to minimize any security threat to the private data server.

c. This data (file) is then published on the internet by publication and discover means as a Web Part (Part of a web page). The name and various other keywords are also published for easy searching of that file. These keywords can be specified or changed by the user while publishing or anytime later. The library server maintains and updates index of all the published files enabling easy searching of the library server.

d. Once the file is published on the internet, this file is now recognized as a searchable item by internet-based search engines. Also, the file can be searched, viewed or downloaded from the library server by any internet user.

As the entire process can be done in a single-click or with minimum interaction from the user, the process is called a Single-Click Publication Process.

One or more users of the internet can subscribe to one or more publication groups of the library server. The subscription to the publication groups can be either free or paid membership. Subscribers of a publication group, if desired, can receive notifications of data published in the publication group. This subscription allows user to view, download existing files in the publishing groups or publish new files. Users can subscribe to any number of publication groups for receiving automatic notifications about published data including updated data. If contents in a publication group are updated, subscribers to the publication group will get the notification right on his/her desktop.

Indexed searching service helps in faster search of data in the library server. The data stored in the library server are indexed according to their groups they are published in, their type, size and various other parameters which helps in easy searching and sorting of files.

As mentioned above, the data in the library server are categorized in various publication groups. A user can also create his/her own groups for publishing files. These groups can then be subscribed for existing, new or changed file by any internet user.

Step 3 & 4: Republishing: If the same data (file which was published) is updated on the client device, it is automatically uploaded on to the private data server. For this purpose, the system comprises a synchronizer which identifies existence of updated data on the client device. The synchronizer makes the corresponding changes or in other words overwrites the published data contained in the library server.

This way once the user has published a data, the changes made at the user device will be automatically reflected in the published document as well. However, user can choose not to republish the modified document. Users subscribed for the publication group where updated data has been republished can automatically be notified about the changes made to this published file. The Publishing manager checks to which group this updated published file belong to & then update the relevant RSS. The publishing manager also updates the meta search engine that is exposed to search engine so that now the updated information is searched thru the internet search engine.

Step 5: Un-publishing: The user may choose to Un-publish the files which are published currently. This action will simply remove the published file from the library server.

Step 6: Feeding the data using RSS and/or Atom format: The published content can also be exposed as feed using RSS and Atom format. Once the content is published, the RSS feed for that format is updated and the users subscribing to that RSS (publication group) can be notified. The content can hence be delivered directly on user's desktop.

We claim:

1. A system comprising:
a private data server configured to receive data for publication from a user device, and store the data;
a library server;
a publication manager having a list of publication groups and being configured to receive from the user device a selection of at least one publication group and in response, copy the data from the private data server to the library server;

the library server being in communication with the private data server and the publication manager for storing the data for publication in the selected publication group and further storing an index of the data for publication, where the library server is located separately from the private data server;

a publication and discovery subsystem for publishing the data stored in the library server on an internet, thereby enabling sharing of the data by internet users; and a synchronizer for identifying existence of updated data on the user device, which is in the form of a changed or overwritten file or directory, and when requested by the user device, copying the updated data to the library server.

2. The system as claimed in claim 1, wherein the data received by the private data server is in the form of a file or a directory.

3. The system as claimed in claim 1, wherein the private data server is configured to store the data online.

4. The system as claimed in claim 1, wherein the publication manager is configured to generate an RSS format file and/or an Atom format file for the data thus copied on to the library server.

5. The system as claimed in claim 1, wherein the publication manager is configured to copy the data from the private data server to the selected publication group.

6. The system as claimed in claim 1, wherein the system further comprises an indexed searching subsystem for indexing the data stored in the library server according to groups the data is stored in, a type of the data, and a size of the data.

7. The system as claimed in claim 1, wherein the publication and discovery subsystem is to optimize the data for access by search engines using search engine optimization (SEO) methods.

8. The system as claimed in claim 1, wherein a name and keywords are to be provided by the user device at a time of publishing the data on the internet or at any time subsequent thereafter.

9. The system as claimed in claim 1, wherein the library server is further configured to store an index of subscribers of data in respect of at least one of the publication groups.

10. The system as claimed in claim 4, wherein the RSS format file and/or Atom format file is to be transmitted to subscribers of the selected publication group.

11. The system as claimed in claim 1, wherein if the updated data is copied to the library server, the system is configured to reflect the updated data as published data.

12. The system as claimed in claim 11, wherein if the updated data is copied to the library server, the system is further configured to notify subscribers of the selected publication group of presence of the updated data.

13. The system as claimed in claim 1, wherein the system is configured to allow the user device to withdraw published data from the internet.

14. A method comprising:

receiving, at a private data server from a user device, data for publication;

displaying a list of publication groups and receiving at least one publication group selection;

in response to the selection, copying the data from the private data server to a library server and storing the data for publication in the publication group selected and further storing index of the data for publication, where the library server is located separately from the private data server;

publishing the data stored in the library on an internet, thereby enabling sharing of the data by internet users; and identifying existence of updated data on the user device, which is in the form of a changed or overwritten file or directory, and when requested by the user device, copying the updated data to the library server.

15. The method as claimed in claim 14, wherein the data stored in the private data server is in the form of a file or a directory.

16. The method as claimed in claim 14, wherein the data is stored online by the private data server.

17. The method as claimed in claim 14, wherein a RSS format file and/or an Atom format file is generated for the data copied to the library server.

18. The method as claimed in claim 14, wherein the data from the private data server is copied to the selected publication group.

19. The method as claimed in claim 14, wherein the method further comprises indexing the data stored in the library server according to groups the data is stored in, a type of the data, and a size of the data.

20. The method as claimed in claim 14, wherein the data for access by search engines is optimized using search engine optimization (SEO) methods.

21. The method as claimed in claim 14, wherein the method further comprises providing name and keywords at a time of publishing the data on the internet or at any time subsequent thereafter.

22. The method as claimed in claim 14, wherein the method further comprises storing an index of subscribers of the data in respect of at least one of the publication groups.

23. The method as claimed in claim 17, wherein the method further comprises transmitting the RSS format file and/or Atom format file to a subscriber of the selected publication group.

24. The method as claimed in claim 14, wherein the method further comprises reflecting the updated data as the published data, if the updated data is copied to the library server.

25. The method as claimed in claim 14, wherein the method further comprises notifying presence of updated data to subscribers of the selected publication group.

26. The method as claimed in claim 14, wherein the method further comprises allowing withdrawal of published data from the internet.

* * * * *

UNITED STATES PATENT AND TRADEMARK OFFICE
CERTIFICATE OF CORRECTION

PATENT NO. : 8,209,285 B2
APPLICATION NO. : 12/090658
DATED : June 26, 2012
INVENTOR(S) : Pankaj Anand et al.

It is certified that error appears in the above-identified patent and that said Letters Patent is hereby corrected as shown below:

On the Title page, Item (30), under "Foreign Priority Data", line 1,
delete "3049/2005" and insert -- 3049/DEL/2005 --, therefor.

In column 8, line 12, in Claim 14, after "library" insert -- server --, therefor.

Signed and Sealed this
Twenty-sixth Day of February, 2013

Teresa Stanek Rea
*Acting Director of the United States Patent and Trademark Office*